Patented May 22, 1951

2,553,555

UNITED STATES PATENT OFFICE 2,553,555

CHLOROPHENOXYACETALDEHYDE DIETHYL ACETALS

Lewis R. Drake, Midland, Mich., assignor to The Dow Chemical Company, Midland, Mich., a corporation of Delaware No Drawing. Application February 27, 1950, Serial No. 146,630

7 Claims. (Cl. 260—613)

This invention is concerned with the chlorophenoxyacetaldehyde diethyl acetals of the formula

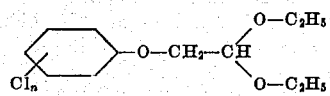

wherein $n$ is an integer not greater than 5. These new compounds are crystalline solids or oily liquids, somewhat soluble in many organic solvents, and substantially insoluble in water. They are of value as intermediates for the preparation of other organic compounds and as constituents of plant growth control compositions.

The new compounds may be prepared by various methods. A preferred procedure comprises reacting a sodium chlorophenate with chloroacetal (1-chloro-2,2-diethoxyethane). In carrying out the reaction, substantially equimolecular proportions of chloroacetal, sodium methylate, and a chlorophenol are dispersed in ethanol and the resulting mixture heated under autogenous pressure to a temperature of from about 140° to 160° C. for a period of time required to complete the reaction. The reaction mixture may then be filtered and the filtrate fractionally distilled under reduced pressure to separate the desired product.

In an alternative procedure for carrying out the reaction, substantially equimolecular proportions of chloroacetal and a sodium chlorophenate, and a small amount of sodium methylate are dispersed in ethanol and the resulting dispersion heated under autogenous pressure to a temperature of from 140° to 160° C. for a period of time required to complete the reaction. The reaction mixture is then treated in conventional fashion to separate the desired product.

The preferred embodiments of this invention comprise 2,4-dichlorophenoxyacetaldehyde diethyl acetal and 2,4,5-trichlorophenoxyacetaldehyde diethyl acetal.

The following examples illustrate the invention and are not to be construed as limiting:

EXAMPLE 1

*4-chlorophenoxyacetaldehyde diethyl acetal*

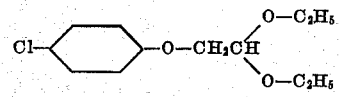

128.5 grams (1 mole) of 4-chlorophenol, 152.5 grams (1 mole) of chloroacetal (having a boiling point of 152° C. at 709 millimeters pressure and a density of 1.008 at 20°/4° C.), and 54 grams (1 mole) of sodium methylate were dispersed in 183 milliliters of ethanol, and the resulting mixture heated under autogenous pressure to a temperature of 145° C. for 16 hours. The ethanol was then removed from the crude mixture by evaporation, and the residue washed with aqueous diethyl ether and dried with anhydrous calcium chloride. The dried extract was fractionally distilled under reduced pressure to separate 4-chlorophenoxyacetaldehyde diethyl acetal as an oily liquid boiling at 145° C. at 8 millimeters pressure and having a density of 1.116 at 25° C.

EXAMPLE 2

*2-chlorophenoxyacetaldehyde diethyl acetal*

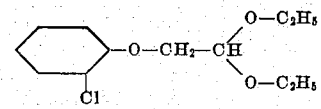

12.5 grams (1 mole) of 2-chlorophenol, 152.5 grams (1 mole) of chloroacetal, and 54 grams (1 mole) of sodium methylate were dispersed in 162 milliliters of ethanol, and the resulting mixture heated under autogenous pressure to a temperature of 145° C. for 16 hours. The ethanol was then removed from the crude mixture by evaporation, and the residue washed with water, extracted with diethyl ether, and the ether extract dried with anhydrous calcium chloride. The dried extract was fractionally distilled under reduced pressure to obtain 2-chlorophenoxyacetaldehyde diethyl acetal as an oily liquid having a refractive index $n/D$ of 1.118 at 25° C.

EXAMPLE 3

*2,4-dichlorophenoxyacetaldehyde diethyl acetal*

326 grams (2 moles) of 2,4-dichlorophenol, 305 grams (2 moles) of chloroacetal, and 108 grams (2 moles) of sodium methylate were dispersed in 360 milliliters of ethanol, and the resulting mixture heated under autogenous pressure to a temperature of 150° C. for 18 hours. The reaction mixture was then filtered and the filtrate fractionally distilled under reduced pressure to obtain 2,4-dichlorophenoxyacetaldehyde diethyl acetal as an oily liquid having a density of 1.2095 at 23° C. and a refractive index $n/D$ of 1.5069 at 35° C.

EXAMPLE 4

*2,4,5-trichlorophenoxyacetaldehyde diethyl acetal*

219.5 grams (1 mole) of sodium 2,4,5-trichlorophenate, 152.5 grams (1 mole) of chloroacetal, and 2 grams of sodium methylate were dispersed in 190 milliliters of ethanol, and the resulting mixture heated under autogenous pressure to a temperature of 145° to 150° C. for 64 hours. The crude mixture was then filtered and the filtrate washed with aqueous ethylene dichloride. The residue was fractionally distilled under reduced pressure to separate 2,4,5-trichlorophenoxyacetaldehyde diethyl acetal as a crystalline solid. The latter had a melting point of 19° to 20° C.

EXAMPLE 5

2,4,6-trichlorophenoxyacetaldehyde diethyl acetal 395 grams (2 moles) of 2,4,6-trichlorophenol, 305 grams (2 moles) of chloroacetal, and 108 grams (2 moles) of sodium methylate were dispersed in 457 milliliters of ethanol, and the resulting mixture heated under autogenous pressure to a temperature of 150° C. for 17 hours. The ethanol was then removed from the crude mixture by evaporation, and the resulting product washed with dilute aqueous sodium hydroxide and extracted with diethyl ether. The ether extract was fractionally distilled under reduced pressure to separate 2,4,6-trichlorophenoxyacetaldehyde diethyl acetal as an oily liquid. The latter had a boiling point of 173° C. at 3 millimeters pressure, a density of 1.347 at 23° C., and a refractive index $n/D$ of 1.5702.

EXAMPLE 6

Pentachlorophenoxyacetaldehyde diethyl acetal 288.5 grams (1 mole) of sodium pentachlorophenate, 152.5 grams (1 mole) of chloroacetal, and 2 grams of sodium methylate were dispersed in 381 milliliters of ethanol and the resulting mixture heated under autogenous pressure to a temperature of from 145° to 150° C. for 64 hours. The reaction mixture was then washed with aqueous ethylene dichloride, filtered, and the filtrate dried with calcium chloride. The dried extract was fractionally distilled under reduced pressure to obtain pentachlorophenoxyacetaldehyde diethyl acetal as a crystalline solid. The latter was recrystallized from a diethyl ether-ethanol mixture and found to melt at 45° C.

I claim:

1. A chlorophenoxyacetaldehyde diethyl acetal having the formula

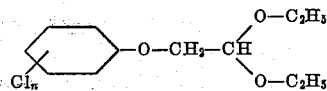

wherein $n$ is an integer not greater than 5.

2. A polychlorophenoxyacetaldehyde diethyl acetal having the formula

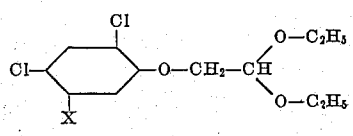

wherein X represents a member of the group consisting of chlorine and hydrogen.

3. 4-chlorophenoxyacetaldehyde diethyl acetal.

4. 2,4-dichlorophenoxyacetaldehyde diethyl acetal.

5. 2,4,5-trichlorophenoxyacetaldehyde diethyl acetal.

6. 2,4,6-trichlorophenoxyacetaldehyde diethyl acetal.

7. Pentachlorophenoxyacetaldehyde diethyl acetal.

LEWIS R. DRAKE.

REFERENCES CITED

The following references are of record in the file of this patent:

UNITED STATES PATENTS

| Number | Name | Date |
|---|---|---|
| 2,124,686 | Carothers et al. | July 26, 1938 |
| 2,463,541 | Houk | Mar. 8, 1949 |